US012037221B2

(12) United States Patent
Ostberg

(10) Patent No.: US 12,037,221 B2
(45) Date of Patent: Jul. 16, 2024

(54) HOIST CAGE ASSEMBLY

(71) Applicant: Mark Ostberg, Hemet, CA (US)

(72) Inventor: Mark Ostberg, Hemet, CA (US)

( * ) Notice: Subject to any disclaimer, the term of this patent is extended or adjusted under 35 U.S.C. 154(b) by 597 days.

(21) Appl. No.: 17/363,447

(22) Filed: Jun. 30, 2021

(65) Prior Publication Data

US 2023/0002199 A1 Jan. 5, 2023

(51) Int. Cl.
*B66C 1/10* (2006.01)
*B66C 1/12* (2006.01)
*B66C 1/66* (2006.01)

(52) U.S. Cl.
CPC .............. *B66C 1/101* (2013.01); *B66C 1/127* (2013.01); *B66C 1/663* (2013.01)

(58) Field of Classification Search
CPC B66C 1/101; B66C 1/663; B66C 1/16; B66C 1/22; B66C 1/127
USPC .................... 294/81.21, 67.33, 76, 77, 82.35
See application file for complete search history.

(56) References Cited

U.S. PATENT DOCUMENTS 1,555,022 A 9/1925 Proctor
2,998,994 A * 9/1960 Karr ........................ B66C 1/127 294/67.1
3,519,302 A 7/1970 Orenstein
3,572,802 A 3/1971 Zupancic
3,961,585 A * 6/1976 Brewer ................... B66C 1/127 410/97
4,204,710 A * 5/1980 Rothaemel .............. B66C 1/127 294/97
5,320,394 A * 6/1994 Urbank ................... B63B 23/60 114/44
5,419,601 A 5/1995 Mikkola
5,507,237 A * 4/1996 Barrow ..................... B66C 1/16 108/55.3
6,565,136 B1 5/2003 Parker
7,448,661 B2 * 11/2008 Daigle ...................... B66C 1/18 383/24
2003/0202863 A1 * 10/2003 Stansbury ................. B66C 1/16 414/137.1
2004/0217611 A1 * 11/2004 Liberato .................. A62B 1/02 294/77
2009/0241809 A1 * 10/2009 Head ......................... B66C 1/10 220/23.91
2014/0008926 A1 * 1/2014 Allen ........................ B66C 1/22 294/67.1
2019/0225400 A1 * 7/2019 Weyrauch .......... B65D 77/0466
2021/0214193 A1 * 7/2021 Gray ....................... B66C 1/101
2021/0347618 A1 * 11/2021 Friedrich ............. B65G 59/067

* cited by examiner

*Primary Examiner* — Paul T Chin

(57) ABSTRACT

A hoist cage assembly for lifting a pallet with a crane includes a cage that has a bottom end that is open for positioning around a pallet of material. The cage has a plurality of bar openings each extending through the cage. A plurality of bars is each of the bars is slidable through a respective pair of the bar openings to extend through the pallet when the cage is lowered over the pallet. Each of the bars rests on the cage when the cage is lifted to lift the pallet when the cage is lifted. A plurality of sleeves is each of the sleeves is coupled to the cage and the sleeves are strategically arranged on the cage thereby facilitating each of the bars to be slidably stored in the plurality of sleeves.

8 Claims, 7 Drawing Sheets

HOIST CAGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cage devices and more particularly pertains to a new cage device for lifting a pallet with a crane. The device includes a cage with an open bottom end and an open top end such that the cage can be positioned around a pallet. The cage has a plurality of bar openings and a plurality of bars is each slidable through the bar openings and through the pallet. In this way the bars transfer the weight of the pallet onto the cage when the cage is lifted thereby facilitating the pallet to be lifted with a crane.

(2) Description of Related Art Including Information Disclosed Under 37 CFR 1.97 and 1.98

The prior art relates to cage devices including a variety of lifting fork devices that are attachable to a crane for lifting a pallet with the crane. The prior art discloses a lifting platform for lifting stacked material with a crane. The prior art discloses a variety of lifting slings for lifting a load from multiple points with a single lifting line. The prior art discloses a lifting cage that includes forks that are integrated into the cage for lifting with a crane.

BRIEF SUMMARY OF THE INVENTION

An embodiment of the disclosure meets the needs presented above by generally comprising a cage that has a bottom end that is open for positioning around a pallet of material. The cage has a plurality of bar openings each extending through the cage. A plurality of bars is each of the bars is slidable through a respective pair of the bar openings to extend through the pallet when the cage is lowered over the pallet. Each of the bars rests on the cage when the cage is lifted to lift the pallet when the cage is lifted. A plurality of sleeves is each of the sleeves is coupled to the cage and the sleeves are strategically arranged on the cage thereby facilitating each of the bars to be slidably stored in the plurality of sleeves.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
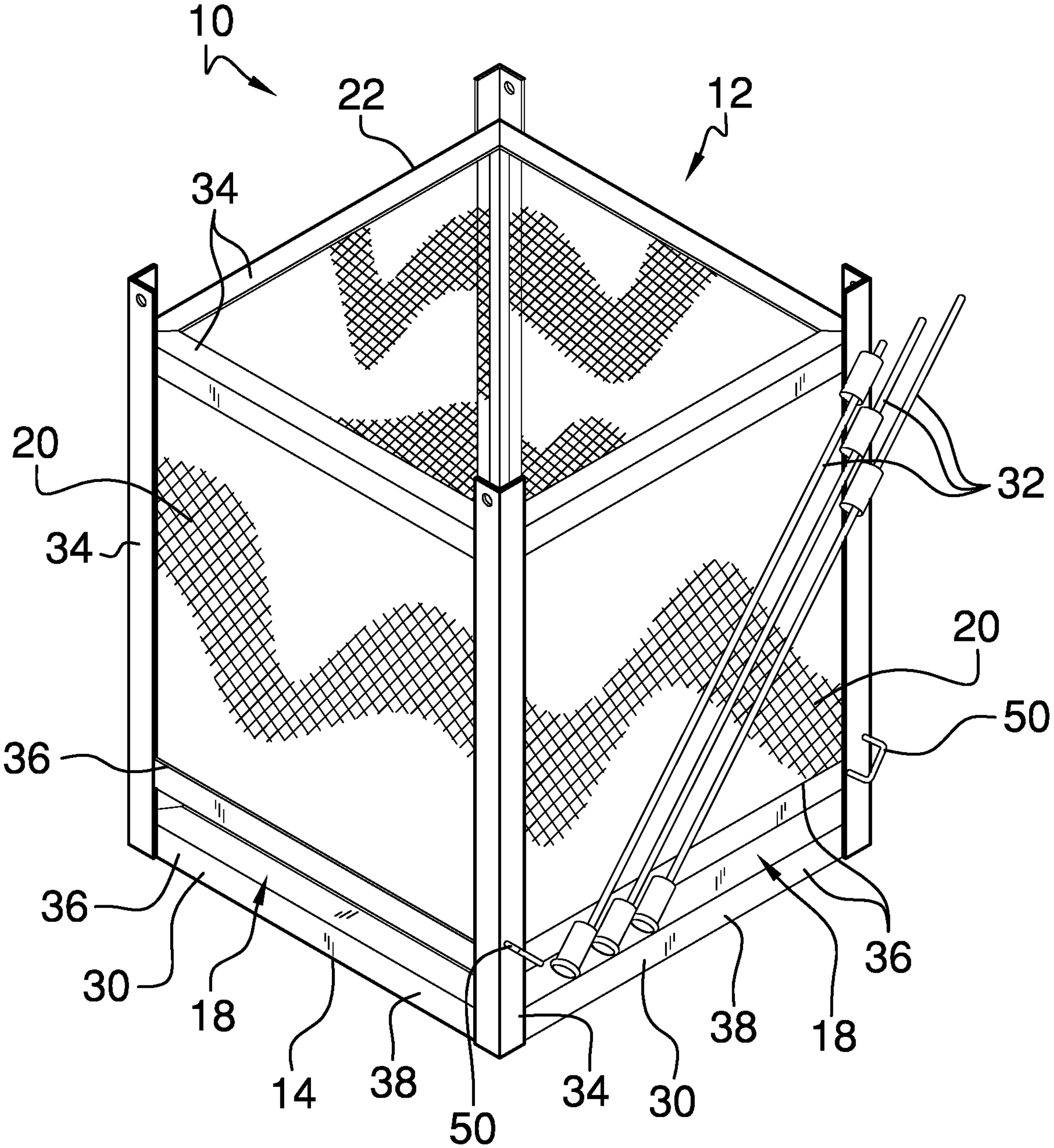
FIG. 1 is a perspective view of a hoist cage assembly according to an embodiment of the disclosure.
Figure 2:
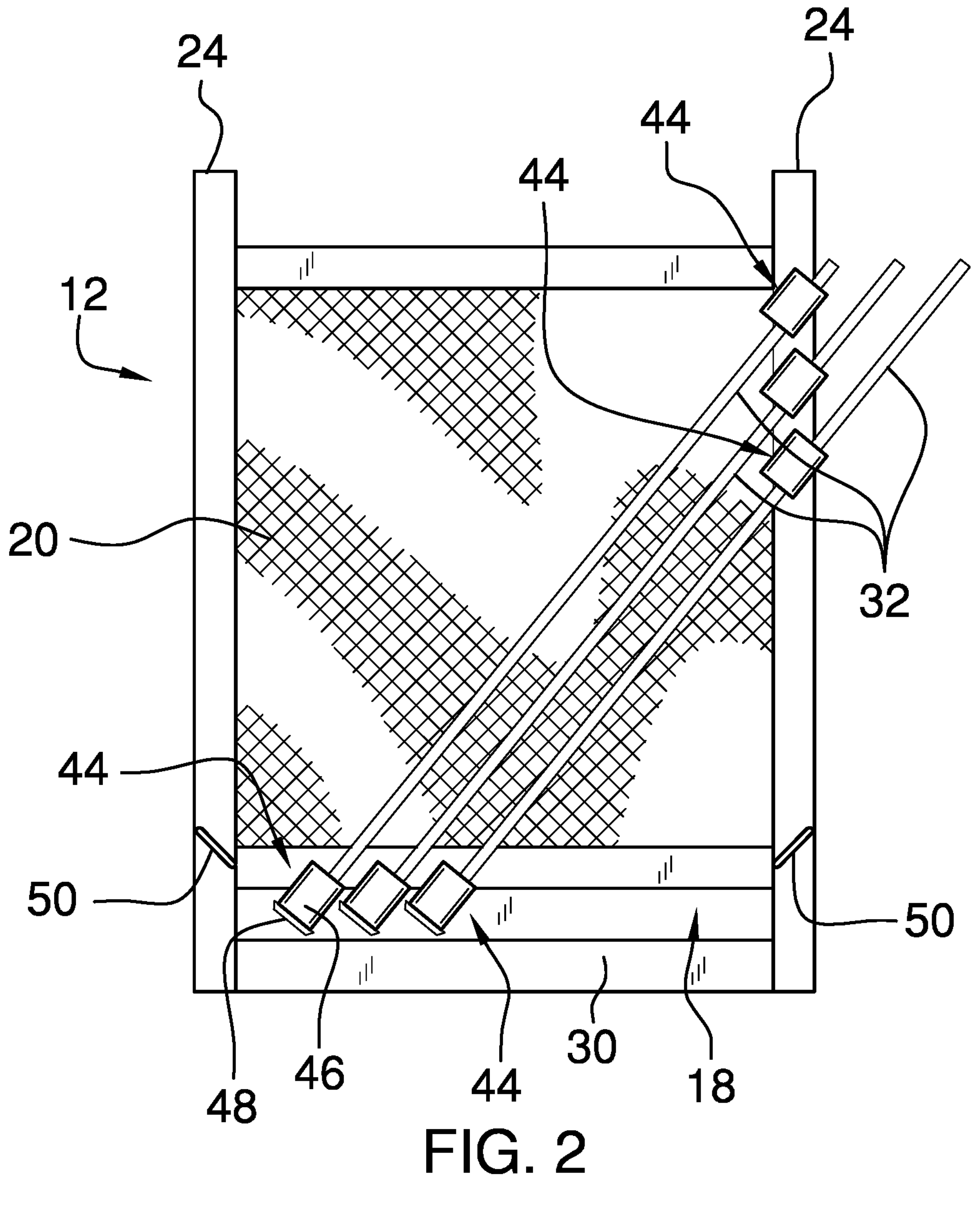
FIG. 2 is a right side view of an embodiment of the disclosure.
Figure 3:
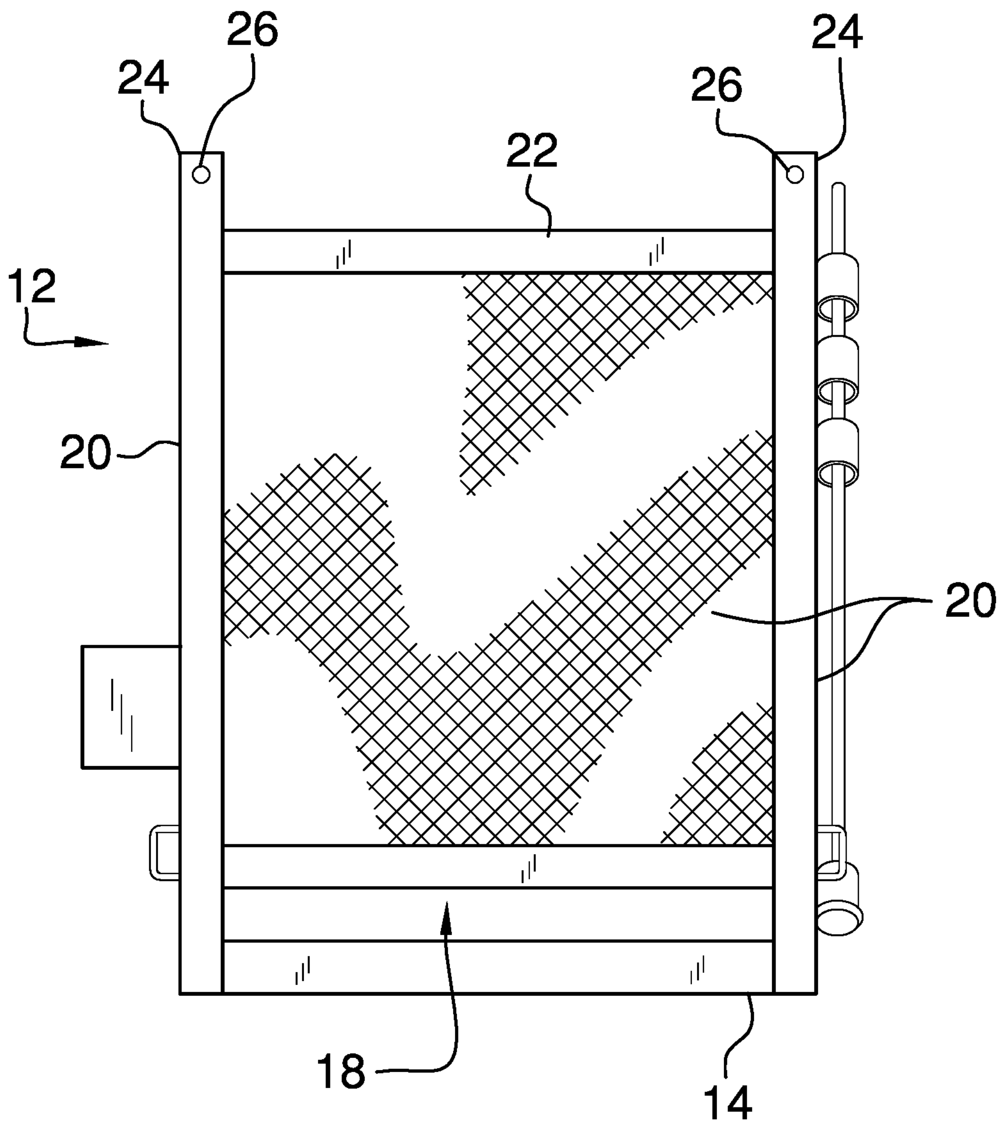
FIG. 3 is a front view of an embodiment of the disclosure.
Figure 4:
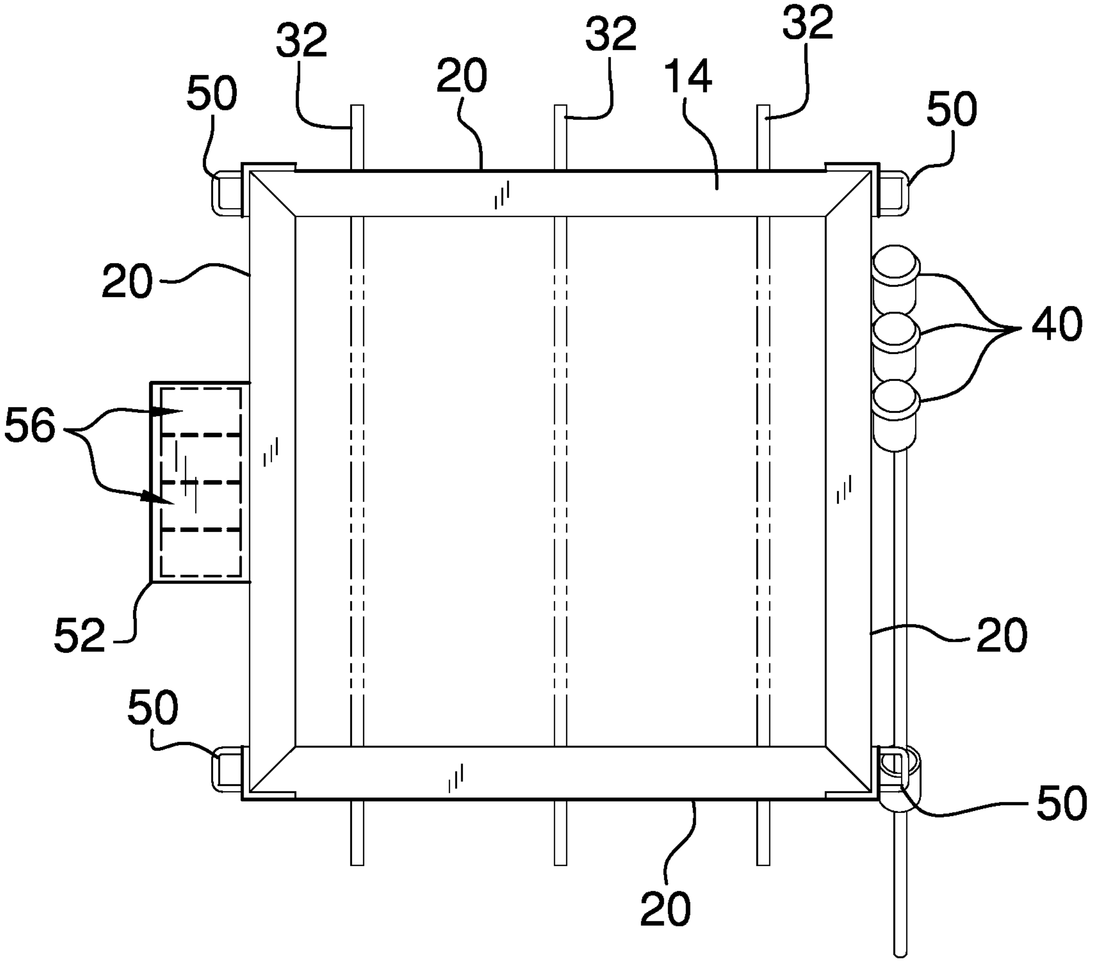
FIG. 4 is a bottom phantom view of an embodiment of the disclosure.
Figure 5:
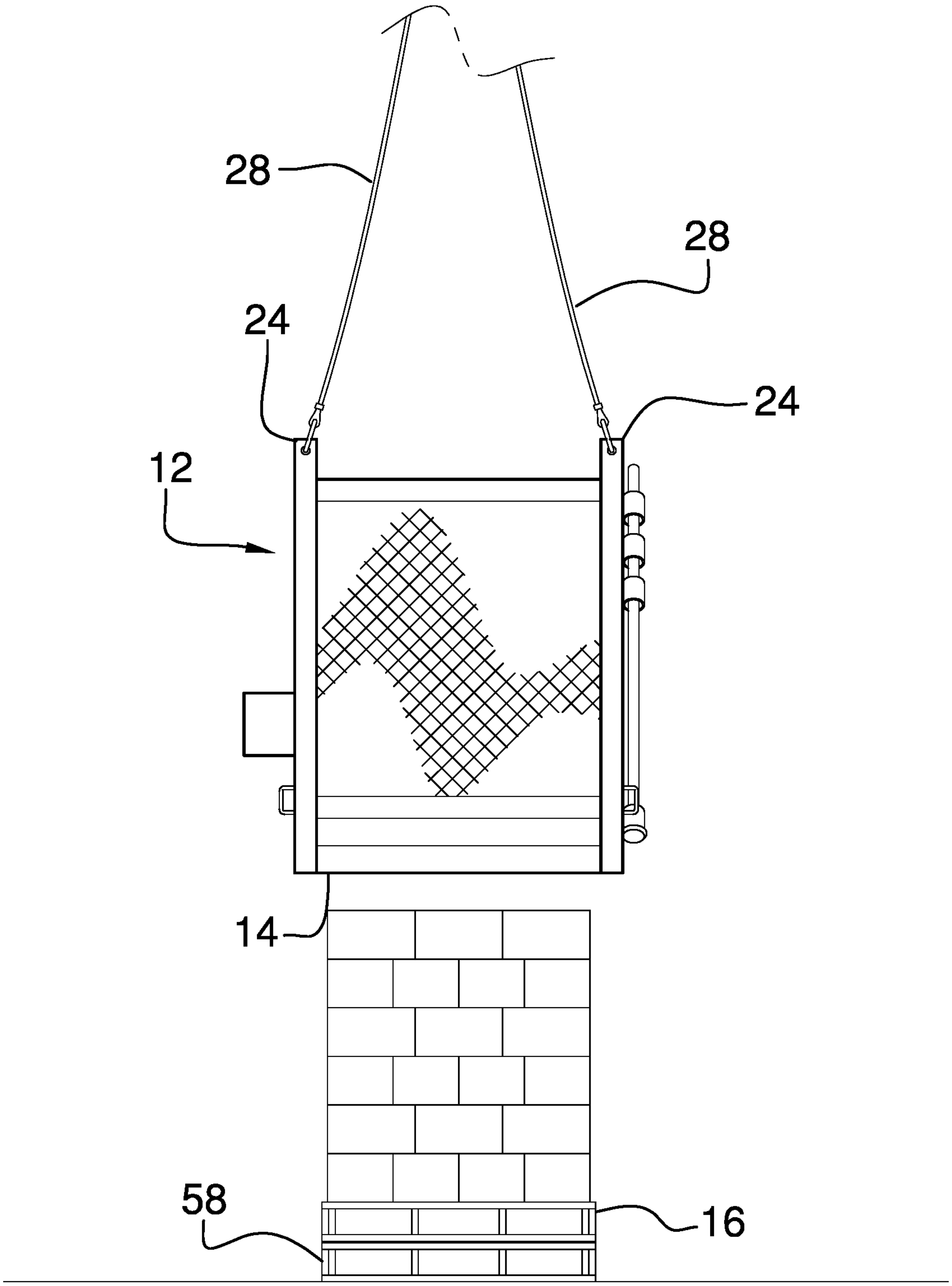
FIG. 5 is a perspective in-use view of an embodiment of the disclosure showing a cage being lowered around a pallet.
Figure 6:
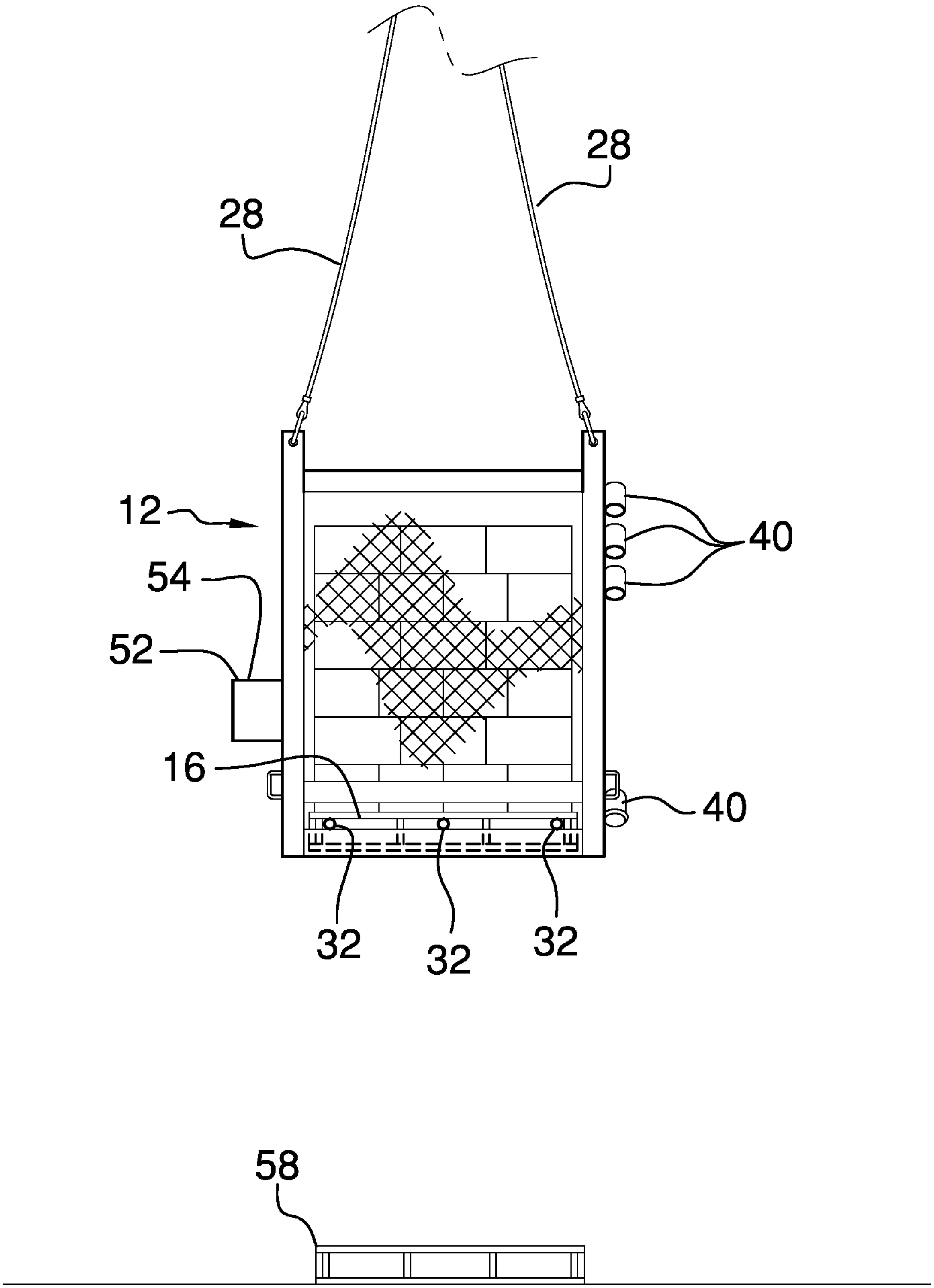
FIG. 6 is a perspective in-use view of an embodiment of the disclosure showing a pallet being lifted with a cage.
Figure 7:
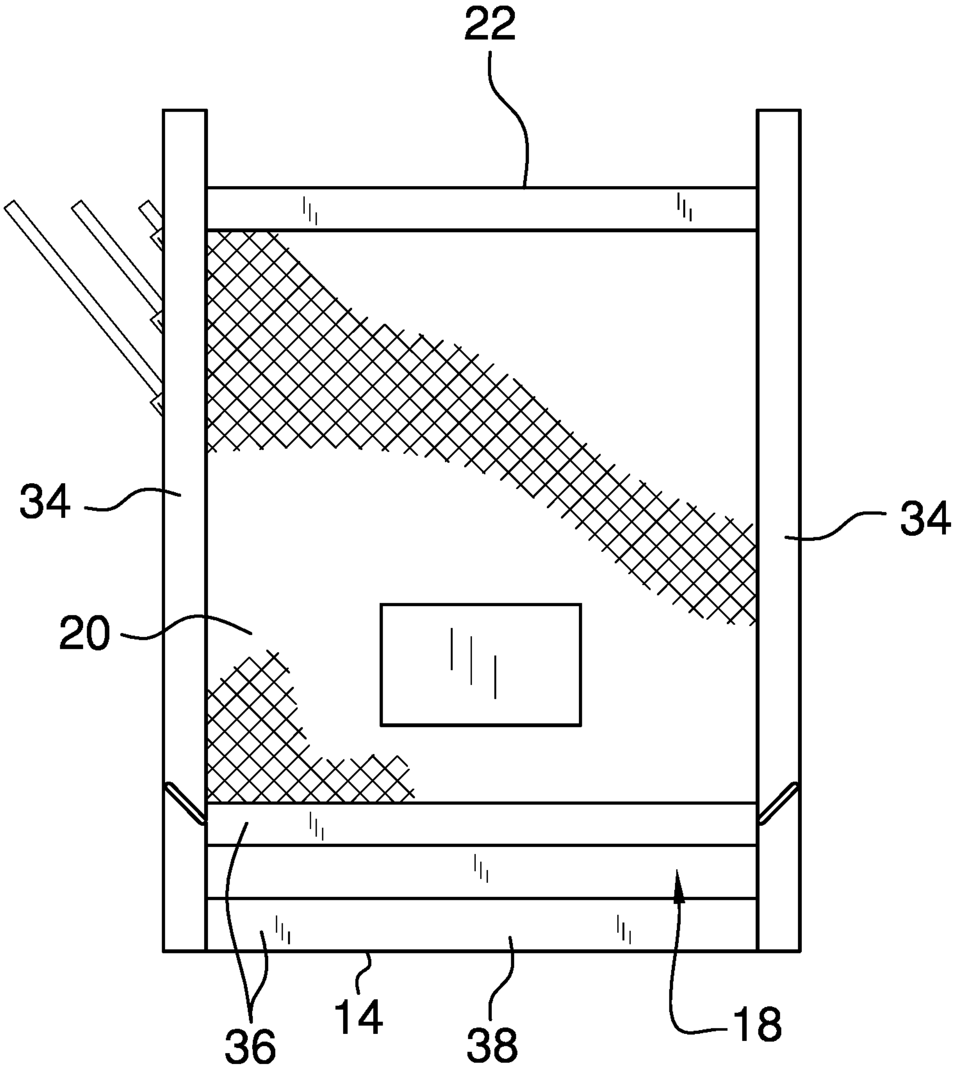
FIG. 7 is a left side view of an embodiment of the disclosure.

With reference now to the drawings, and in particular to FIGS. 1 through 7 thereof, a new cage device embodying the principles and concepts of an embodiment of the disclosure and generally designated by the reference numeral 10 will be described.

As best illustrated in FIGS. 1 through 7, the hoist cage assembly 10 generally comprises a cage 12 has a bottom end 14 is open to facilitate the cage 12 to be positioned around a pallet 16 of material. The pallet 16 of material might be concrete masonry blocks, bags of concrete mix or any type of material that would commonly be found on an industrial construction site. Additionally, the cage 12 has a plurality of bar openings 18 each extending through the cage 12. The cage 12 has a plurality of outer walls 20 that each extends between the bottom end 14 and a top end 22 of the cage 12, and the outer walls 20 intersect each other such that the cage 12 has a rectangular shape. The top end 22 is open to accommodate the height of the pallet 16 of material.

The cage 12 has a plurality of lift points 24 and each of the lift points 24 extends upwardly from the top end 22 of the cage 12. Each of the lift points 24 is positioned at an intersection between a respective pair of the outer walls 20 of the cage 12. Additionally, each of the lift points 24 has a hole 26 extending through the lift point 24 to have a lifting line 28 extended through each hole 26 for lifting the cage 12.

The lifting line 28 may be a four point sling that is attached to a crane line, a hoist line or other type of lifting machinery.

Each of the bar openings 18 extends through a respective one of the outer walls 20. Additionally, each of the bar openings 18 is bounded by a bottom threshold 30 of the respective outer wall. A plurality of bars 32 is provided and each of the bars 32 is slidable through a respective pair of the bar openings 18. In this way each of the bars 32 can be extended through the pallet 16 when the cage 12 is lowered over the pallet 16. Moreover, each of the bars 32 rests on the bottom threshold 30 of respective outer walls 20 when the cage 12 is lifted. In this way each of the bars 32 transfers the weight of the pallet 16 onto the cage 12 thereby facilitating the cage 12 to lift the pallet 16 when the cage 12 is lifted.

The cage 12 might include a plurality of intersecting members 34 that form a frame of the cage 12. The plurality of intersecting members 34 might include a series of members 36 that are horizontally oriented and vertically spaced apart from each other to define the bar openings 18. Thus, each of the bars 32 might rest on a lowermost one 38 of the series of members 36 that are spaced apart from each other. Additionally, each of the outer walls 20 of the cage 12 might comprise a steel mesh or other similar type of rigid, resilient material. The intersecting members 34 might be comprised of steel such that the cage 12 has a weight capacity of several thousand pounds.

A plurality of sleeves 40 is provided and each of the sleeves 40 is coupled to the cage 12. The sleeves 40 are strategically arranged on the cage 12 thereby facilitating each of the bars 32 to be slidably stored in the plurality of sleeves 40. Each of the sleeves 40 has an outside wall 42 and the outside wall 42 of each of the sleeves 40 is coupled to a respective outer wall 20 of the cage 12. The plurality of sleeves 40 includes a plurality of pairs of the sleeves 44, and each of the pairs of sleeves 44 is aligned with each other on the outer wall 20 such that each of the pairs of sleeves 44 is facilitated to slidably receive a respective one of the bars 32 for storage.

Each of the pairs of sleeves 44 includes a closed sleeve 46, and the closed sleeve 46 has a lower end 48 which is closed. In this way the lower end 48 of the closed sleeve 46 inhibits the bar 32 from falling through the closed sleeve 46. The closed sleeve 46 of each of the pairs of sleeves 44 is positioned adjacent to the bar opening 18 in the respective outer wall 20 of the cage 12. Each of the pairs of sleeves 44 is arranged such that the bars 32 are oriented at a diagonal line on the respective outer wall 20 of the cage 12 when the bars 32 are stored in the sleeves 40.

A plurality of handles 50 is each coupled to a respective outer wall 20 of the cage 12 such that each of the handles 50 can be gripped. Each of the handles 50 is positioned on opposite sides of the cage 12 with respect to each other. In this way the plurality of handles 50 facilitate a worker to guide the cage 12 around the pallet 16 when the cage 12 is being lowered around the pallet 16. A box 52 is coupled to a respective outer wall 20 of the cage 12 to store objects and the box 52 has a top side 54 that is open. As is most clearly shown in FIG. 4, the box 52 may have a plurality of compartments 56 integrated into the box 52.

In use, each of the lifting lines 28 is coupled to the respective lift point 24 and the cage 12 is lowered around the pallet 16 of material. As is most clearly shown in FIG. 5, a spacing pallet 58 is positioned beneath the pallet 16 of material. In this way the pallet 16 of material is aligned with the bar openings 18. Each of the bars 32 is slid through the bar openings 18 in opposing outer walls 20 of the cage 12. In this way the bars 32 pass through the pallet 16 and rest against the bottom threshold 30 of the opposing outer walls 20. Thus, the bars 32 transfer the weight of the pallet 16 into the bottom threshold 30 of the opposing outer walls 20 when the cage 12 is lifted. In this way a single pallet, or a stack of pallets, can be safely lifted with a crane or hoist. Additionally, the outer walls 20 of the cage 12 ensure that no material can fall out of the pallet(s) 16 while the pallet(s) 16 is/are being lifted. The bars 32 are removed from the bar opening 18 in the opposing outer walls 20 when the pallet 16(*s*) is lowered to its drop off point, the bars 32 are stored in the sleeves 40 and the cage 12 is lifted away from the pallet(s) 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hoist cage assembly for lifting a pallet of material with a crane, said assembly comprising:

a cage having a bottom end being open wherein said cage is configured to be positioned around a pallet of material, said cage having a plurality of bar openings each extending through said cage;

a plurality of bars, each of said bars being slidable through a respective pair of said bar openings wherein each of said bars is configured to extend through the pallet when said cage is lowered over the pallet, each of said bars resting on said cage when said cage is lifted wherein each of said bars is configured to transfer the weight of the pallet onto said cage thereby facilitating said cage to lift the pallet when said cage is lifted; and a plurality of sleeves, each of said sleeves being coupled to said cage, said sleeves being strategically arranged on said cage thereby facilitating each of said bars to be slidably stored in said plurality of sleeves.

2. The assembly according to claim 1, wherein:

said cage has a plurality of outer walls extending between said bottom end and a top end of said cage, said outer walls intersecting each other such that said cage has a rectangular shape, said top end being open wherein said top end is configured to accommodate the height of the pallet of material;

said cage has a plurality of lift points, each of said lift points extending upwardly from said top end of said cage, each of said lift points being positioned at an intersection between a receptive pair of said outer walls of said cage, each of said lifting points having a hole extending through said lifting point wherein said hole in each of said lifting points is configured to have a lifting line extended through said hole for lifting said cage; and each of said bar openings extends through a respective one of said outer walls, each of said bar openings being bounded by a bottom threshold of said respective outer wall.

3. The assembly according to claim 2, wherein each of said bars rests on said bottom threshold of respective outer walls when said cage is lifted wherein each of said bars is configured to transfer the weight of the pallet onto said cage thereby facilitating said cage to lift the pallet when said cage is lifted.

4. The assembly according to claim 2, wherein each of said sleeves has an outside wall, said outside wall of each of said sleeves being coupled to a respective outer wall of said cage, said plurality of sleeves including a plurality of pairs of said sleeves, each of said pairs of sleeves being aligned with each other on said outer wall such that each of said pairs of sleeves is facilitated to slidably receive a respective one of said bars for storage.

5. The assembly according to claim 4, wherein each of said pairs of sleeves includes a closed sleeve, said closed sleeve having a lower end being closed such that said lower end of said closed sleeve inhibits said bar from falling through said closed sleeve, said closed sleeve of each of said pairs of sleeves being positioned adjacent to said bar opening in said respective outer wall of said cage.

6. The assembly according to claim 4, wherein each of said pairs of sleeves is arranged such that said bars are oriented at a diagonal line on said respective outer wall of said cage when said bars are stored in said sleeves.

7. The assembly according to claim 2, further comprising a plurality of handles, each of said handles being coupled to a respective outer wall of said cage wherein each of said handles is configured to be gripped, each of said handles being positioned on opposite sides of said cage with respect to each other wherein said plurality of handles is configured to facilitate a worker to guide said cage around the pallet when said cage is being lowered around the pallet.

8. A hoist cage assembly for lifting a pallet of material with a crane, said assembly comprising:

a cage having a bottom end being open wherein said cage is configured to be positioned around a pallet of material, said cage having a plurality of bar openings each extending through said cage, said cage having a plurality of outer walls extending between said bottom end and a top end of said cage, said outer walls intersecting each other such that said cage has a rectangular shape, said top end being open wherein said top end is configured to accommodate the height of the pallet of material, said cage having a plurality of lift points, each of said lift points extending upwardly from said top end of said cage, each of said lift points being positioned at an intersection between a receptive pair of said outer walls of said cage, each of said lifting points having a hole extending through said lifting point wherein said hole in each of said lifting points is configured to have a lifting line extended through said hole for lifting said cage, each of said bar openings extending through a respective one of said outer walls, each of said bar openings being bounded by a bottom threshold of said respective outer wall;

a plurality of bars, each of said bars being slidable through a respective pair of said bar openings wherein each of said bars is configured to extend through the pallet when said cage is lowered over the pallet, each of said bars resting on said bottom threshold of respective outer walls when said cage is lifted wherein each of said bars is configured to transfer the weight of the pallet onto said cage thereby facilitating said cage to lift the pallet when said cage is lifted;

a plurality of sleeves, each of said sleeves being coupled to said cage, said sleeves being strategically arranged on said cage thereby facilitating each of said bars to be slidably stored in said plurality of sleeves, each of said sleeves having an outside wall, said outside wall of each of said sleeves being coupled to a respective outer wall of said cage, said plurality of sleeves including a plurality of pairs of said sleeves, each of said pairs of sleeves being aligned with each other on said outer wall such that each of said pairs of sleeves is facilitated to slidably receive a respective one of said bars for storage, each of said pairs of sleeves including a closed sleeve, said closed sleeve having a lower end being closed such that said lower end of said closed sleeve inhibits said bar from falling through said closed sleeve, said closed sleeve of each of said pairs of sleeves being positioned adjacent to said bar opening in said respective outer wall of said cage, each of said pairs of sleeves being arranged such that said bars are oriented at a diagonal line on said respective outer wall of said cage when said bars are stored in said sleeves;

a plurality of handles, each of said handles being coupled to a respective outer wall of said cage wherein each of said handles is configured to be gripped, each of said handles being positioned on opposite sides of said cage with respect to each other wherein said plurality of handles is configured to facilitate a worker to guide said cage around the pallet when said cage is being lowered around the pallet; and a box being coupled to a respective outer wall of said cage wherein said box is configured to store objects, said box having a top side being open.

* * * * *